United States Patent
Corry et al.

(10) Patent No.: US 7,870,257 B2
(45) Date of Patent: Jan. 11, 2011

(54) ENHANCING REAL-TIME PERFORMANCE FOR JAVA APPLICATION SERVING

(75) Inventors: Kevin M. Corry, Pflugerville, TX (US); Mark A. Peloquin, Austin, TX (US); Steven L. Pratt, Leander, TX (US); Karl M. Rister, Austin, TX (US); Andrew M. Theurer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 12/131,155

(22) Filed: Jun. 2, 2008

(65) Prior Publication Data

US 2009/0300092 A1    Dec. 3, 2009

(51) Int. Cl.
G06F 15/173    (2006.01)
(52) U.S. Cl. ...................................... 709/226; 707/813
(58) Field of Classification Search ................. 709/238, 709/226; 707/813
See application file for complete search history.

(56) References Cited

U.S. PATENT DOCUMENTS

| | | | | |
|---|---|---|---|---|
| 6,611,858 | B1 * | 8/2003 | Aravamudan et al. | 709/203 |
| 6,934,726 | B2 * | 8/2005 | Sokolov et al. | 1/1 |
| 7,516,292 | B2 * | 4/2009 | Kimura et al. | 711/170 |
| 7,529,786 | B2 * | 5/2009 | Andreasson | 1/1 |
| 2005/0240641 | A1 | 10/2005 | Kimura et al. | |
| 2006/0026563 | A1 * | 2/2006 | Cabillic | 717/118 |
| 2006/0209695 | A1 | 9/2006 | Archer et al. | |
| 2007/0033240 | A1 | 2/2007 | Barsness et al. | |
| 2007/0136402 | A1 | 6/2007 | Grose et al. | |

OTHER PUBLICATIONS

Automatic Heap Sizing: Taking Real Memory Into Account, Ting Yang, Dpt Computer Science University of Massachusetts, Oct. 2004.*

* cited by examiner

*Primary Examiner*—Saleh Najjar
*Assistant Examiner*—Marie Georges Henry
(74) *Attorney, Agent, or Firm*—Dillon & Yudell LLP

(57) ABSTRACT

A method, system, and computer-readable medium with executable code for enhancing real-time performance of a client device connected to a java virtual machine by incorporating a java proxy server. Java routing logic of a java proxy server is used to receive a request from a client device to access a java virtual machine. The java proxy server may use the java routing logic to select a java virtual machine from among multiple accessible java virtual machines. The java proxy server selects the java virtual machine that has the greatest amount of free memory, and is not performing a garbage collection operation. Once a java virtual machine is chosen, incoming client device connections are routed to a chosen java virtual machine. Additionally, the java routing logic may instruct one or more of the multiple java virtual machines to only perform garbage collection operations when idle, and when no other java virtual machines are performing garbage collection operations.

18 Claims, 3 Drawing Sheets

ENHANCING REAL-TIME PERFORMANCE FOR JAVA APPLICATION SERVING

BACKGROUND OF THE INVENTION

1. Technical Field

The present invention relates in general to network application servers. Still more particularly, the present invention relates to using a java proxy server to autonomously route incoming connections to multiple java virtual machines.

2. Description of the Related Art

Java virtual machines are common applications of network application servers. While operating as a network application server, a java virtual machine (JVM) must occasionally perform a garbage collection operation. During a garbage collection operation, all other operations of the JVM must cease, which significantly increases the response time of any transactions. This delay may cause problems for client devices accessing the java virtual machine.

SUMMARY OF THE INVENTION

Disclosed is a method, system, and computer-readable medium with executable code for enhancing real-time performance of a client device connected to a java virtual machine by incorporating a java proxy server. Java routing logic of a java proxy server is used to receive a request from a client device to access a java virtual machine. The java proxy server may use the java routing logic to select a java virtual machine from among multiple accessible java virtual machines. The java proxy server selects the java virtual machine that has the greatest amount of free memory, and is not performing a garbage collection operation. Once a java virtual machine is chosen, incoming client device connections are routed to a chosen java virtual machine. Additionally, the java routing logic may instruct one or more of the multiple java virtual machines to only perform garbage collection operations when idle, and when no other java virtual machines are performing garbage collection operations.

The above features of the present invention will become apparent in the following detailed written description.

BRIEF DESCRIPTION OF THE DRAWINGS

The novel features believed characteristic of the invention are set forth in the appended claims. The invention itself, however, will best be understood by reference to the following detailed descriptions of an illustrative embodiment when read in conjunction with the accompanying drawings, wherein:

DETAILED DESCRIPTION OF THE PREFERRED EMBODIMENT

Figure 1:
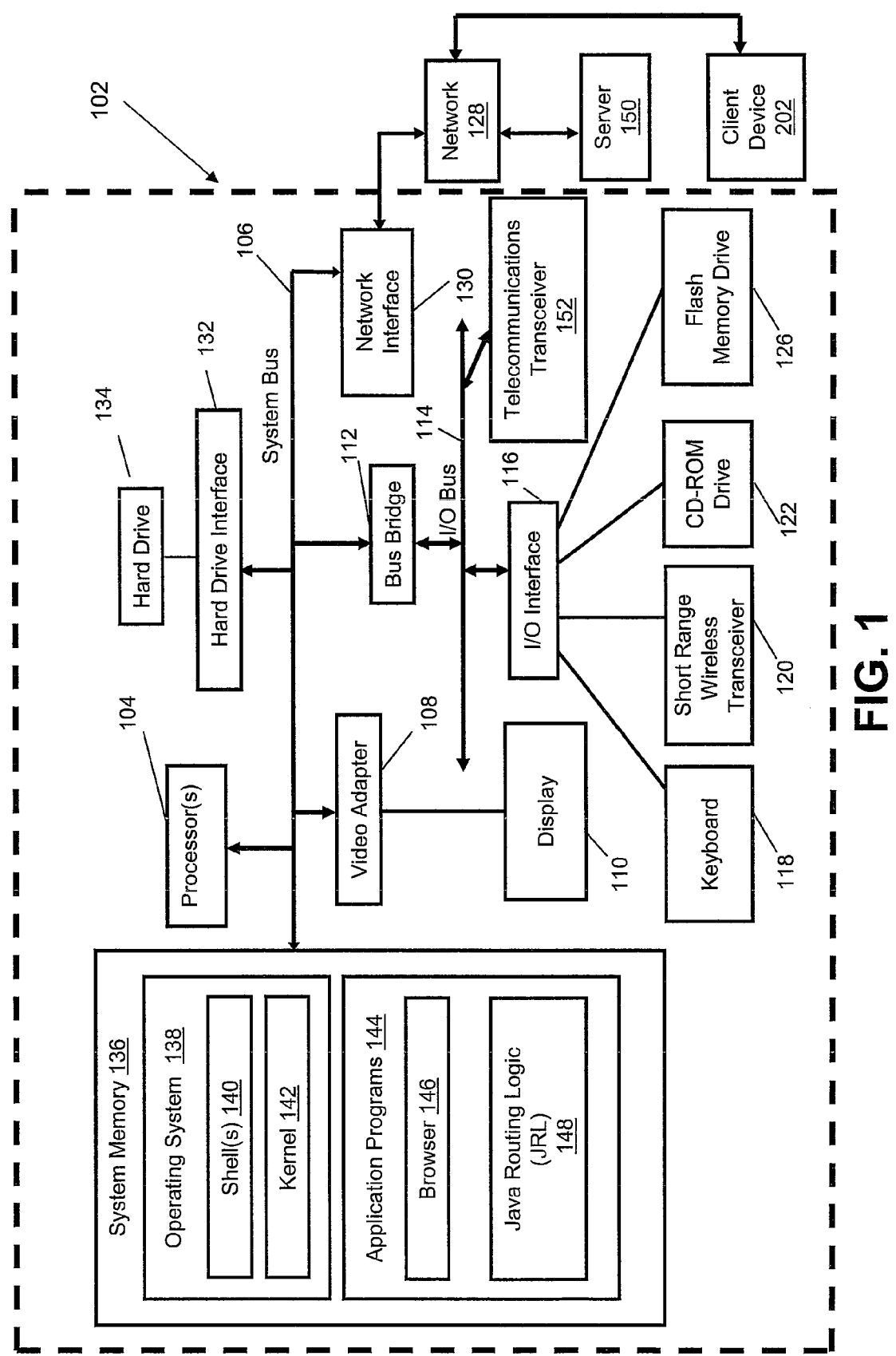
FIG. 1 is a block diagram of a java proxy server in which the present invention may be implemented.

With reference now to FIG. 1, there is depicted a block diagram of an exemplary Java Proxy Server 102 in which the present invention may be implemented. Java Proxy Server 102 includes one or more processors 104 that are coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a Mouse 120, a Compact Disk-Read Only Memory (CD-ROM) drive 122, a floppy disk drive 124, and a flash drive memory 126. Keyboard 118 may be a standard keyboard (e.g., QWERTY style or similar), or a condensed alphanumeric keypad. The format of the ports connected to I/O interface 116 may be any known to those skilled in the art of computer architecture, including but not limited to Universal Serial Bus (USB) ports.

Java Proxy Server 102 is able to communicate with a software deploying server 150 via a network 128 using a network interface 130, which is coupled to system bus 106. Network Interface 130 may utilize wired or wireless technology such as a wireless local area network technology to connect with Network 128 via an access point. Network 128 may be an external network such as the Internet, or an internal network such as an Ethernet or a Virtual Private Network (VPN). Note the software deploying server 150 may utilize a same or substantially similar architecture as Java Proxy Server 102.

A hard drive interface 132 is also coupled to system bus 106. Hard drive interface 132 interfaces with a hard drive 134. In a preferred embodiment, hard drive 134 populates a system memory 136, which is also coupled to system bus 106 with data. System memory is defined as a lowest level of volatile memory in Java Proxy Server 102. This volatile memory includes additional higher levels of volatile memory (not shown), including, but not limited to, cache memory, registers and buffers. Data that populates system memory 136 includes data for operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (also called a command processor) is generally the highest level of the operating system software hierarchy and serves as a command interpreter. The shell 140 provides a system prompt, interprets commands entered by keyboard or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (i.e., Java Proxy Server 102) to send and receive network messages to the Internet using HyperText Transfer Protocol (HTTP) messaging, thus enabling communication with software deploying server 150.

Application programs 144 in system memory of Java Proxy Server 102 (as well as system memory of software deploying server 150) also include a Java Routing Logic (JRL) 148. JRL 148 includes code for implementing the processes described in FIG. 2-3. In one embodiment, Java Proxy Server 102 is able to download JRL 148 from software deploying server 150, including in an "on demand" basis, as described in greater detail below in FIG. 2.

The hardware elements depicted in Java Proxy Server 102 are not intended to be exhaustive, but rather are representative to highlight components required by the present invention. For instance, Java Proxy Server 102 may include alternate memory storage devices such as magnetic cassettes, Digital Versatile Disks (DVDs), Bernoulli cartridges, and the like. These and other variations are intended to be within the spirit and scope of the present invention.

Note further that, in an alternate embodiment of the present invention, software deploying server 150 performs all of the functions associated with the present invention (including execution of JRL 148), thus freeing Java Proxy Server 102 from having to use its own internal computing resources to execute JRL 148.

Figure 2:
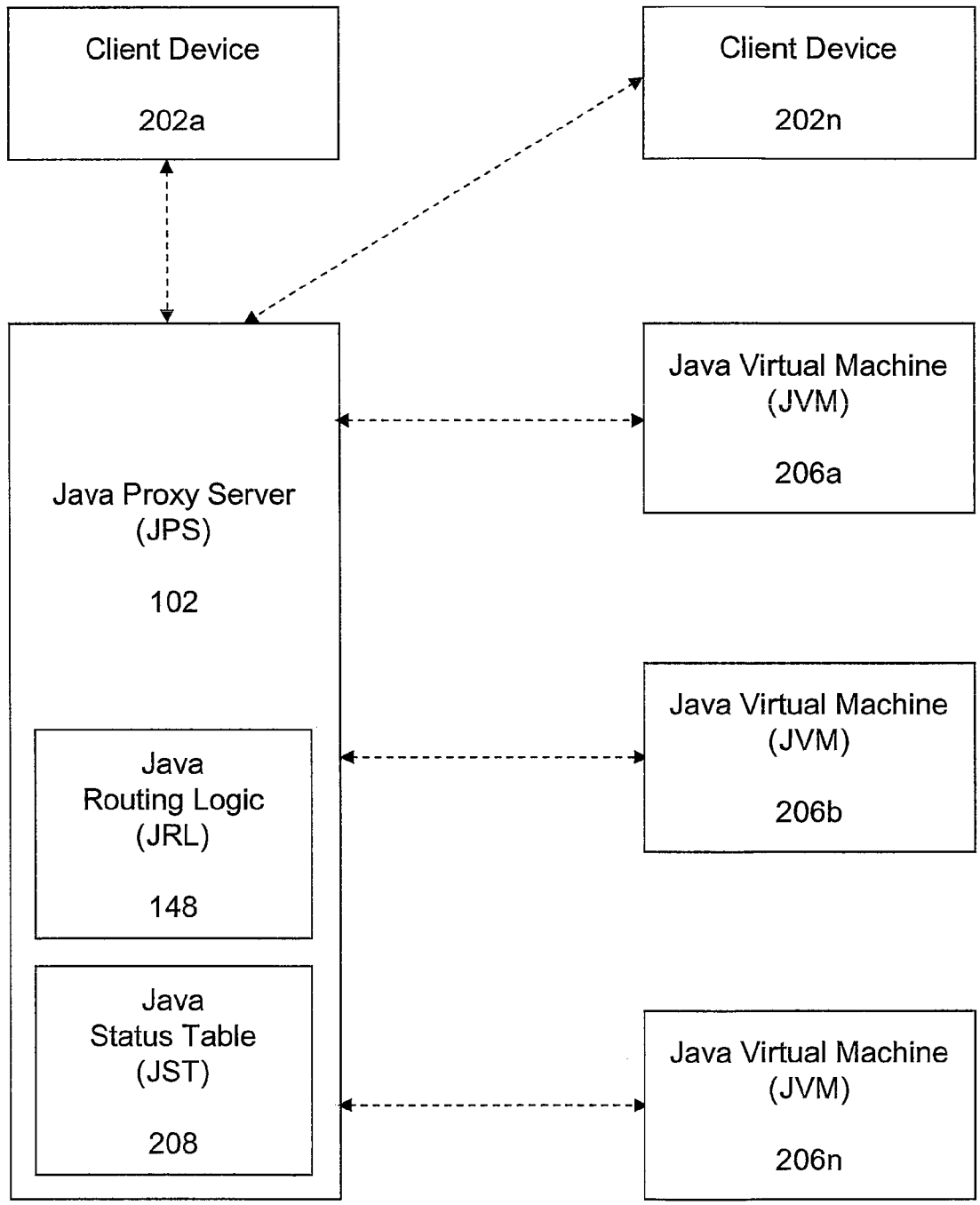
FIG. 2. is a block diagram of an exemplary system for implementing a java proxy server to route incoming connections to two or more java virtual machines.

With reference now to FIG. 2, a block diagram of an exemplary system for implementing a java proxy server to route incoming connections to two or more java virtual machines is presented according to one embodiment. Note also the architecture shown in FIG. 1 for Java Proxy Server (JPS) 102 may be substantially implemented in Client Devices 202*a-n* and Java Virtual Machines (JVM) 206*a-n* shown in FIG. 2. Additionally, by including a Network Interface 106 in the architecture of JPS 102, the appropriate elements illustrated as components of JPS 102 can communicate with JVMs 206*a-n* in the same network as JPS 102.

Note further that, in an alternate embodiment of the present invention, JVMs 206*a-n* may be multiple software instances incorporated into the same architecture of JPS 102, or on server 150.

JPS 102, connected to one or more JVMs 206*a-n* by Network 128, receives a request by a Client Device 202*a-n* to access JVM 206. By using logic internal to JPS 102 (e.g., JRL 148), JPS 102 may autonomously route the incoming connection to a JVM 206*a-n* that is not performing a garbage collection operation. Each JVM 206*a-n* is a java application instance for application serving to Client Devices 202*a-n*. JRL 148 is a logic internal to JPS 102 that analyzes a Java Status Table (JST) 208, which is also internal to JPS 102. JPS 102 may utilize Network 128 to route an incoming request of Client Device 202*a-n* to one of JVMs 206*a-n*.

In an exemplary embodiment, JPS 102 is preconfigured to connect to JVMs 206*a-n* of Network 128. Once a request of a Client Device 202*a-n* to connect to a JVM 206*a-n* has been established by JPS 102, JRL 148 analyzes JST 208 and selects the JVM 206*a-n* with the highest amount of free memory that is not performing a garbage collection. JPS 102 then establishes a connection between the selected JVM 206*a-n* and Client Device 202*a-n* that initiated the request.

A garbage collection is an operation performed by a JVM 206*a-n* that removes extraneous objects from memory. A garbage collection must be occasionally performed by JVMs 206*a-n* to free up memory for future use. While this process is running all other operations of the JVM 206*a-n* must cease. Before beginning garbage collection, a JVM 206*a-n* will send notice to JPS 102 that a garbage collection operation is being performed. Upon JPS 102 receiving this notice, JRL 148 autonomously updates JST 208 to identify the JVM 206*a-n* performing garbage collection as "unavailable". During this time, JRL 208 autonomously routes incoming connections to other JVMs 206*b-n* not currently performing a garbage collection. Upon completing a garbage collection, the JVM 206*a* transmits notice to JPS 102 that the garbage collection operation is complete. Upon receiving this notice, JRL 148 autonomously updates JST 208 to identify JVM 206*a* as "available" for receiving incoming connections of Client Devices 202*a-n*.

JST 208, a list of JVMs 206*a-n* connected to JPS 102, is regularly updated by JRL 148 with information contained in data packets transmitted from JVMs 206*a-n*. JST 208 contains up to date information of connected JVMs 206*a-n*. This information may include the number of Client Devices 202*a-n* currently connected to each connected JVM 206*a-n*, the available memory of each JVM 206*a-n*, which JVMs 206*a-n* are currently performing a garbage collection operation, and the last time a garbage collection was performed by each JVM 206*a-n*. The data packets received by JPS 102 are interpreted by JRL 148 and are specific to the JVM 206*a-n* that transmitted the data packet. The information contained in each data packet may include the number of current connections to a JVM 206*a-n*, the available memory of a JVM 206*a-n*, and the last time a garbage collection was performed by a JVM 206*a-n*. JVM 206*a-n* may transmit data packets to JPS 102 at regular intervals, or upon starting or completing a garbage collection.

When a request by a Client Device 202*a-n* to connect to JVM 206*a-n* is received by JPS 102, JRL 148 selects a recipient JVM 206*a-n* from JST 208. To accomplish this, JRL 148 first eliminates JVMs 206*a-n* that are currently performing a garbage collection operation. JRL 148 may then interconnect the Client Device 202*a-n* to the JVM 206*a-n* with the most amount of free memory. Alternatively, JRL 148 may interconnect the client device to the JVM 206*a-n* with the least number of connections to Client Devices 202*a-n*.

When no connected JVMs 206*a-n* are performing a garbage collection operation, JRL 148 may select the JVM 206 with the least amount of available memory to perform garbage collection. JPS 102 may then transmit an instruction to a JVM 206*a-n* to perform a garbage collection operation. While one JVM 206*a-n* is performing a garbage collection operation, JRL 148 may not route connections of Client Devices 202*a-n* to the JVM 206*a-n* performing garbage collection. Additionally, preferences in JRL 148 establishes if a second JVM 206 may perform a garbage collection operation while another JVM 206*a-n* is already performing a garbage collection operation.

Figure 3:
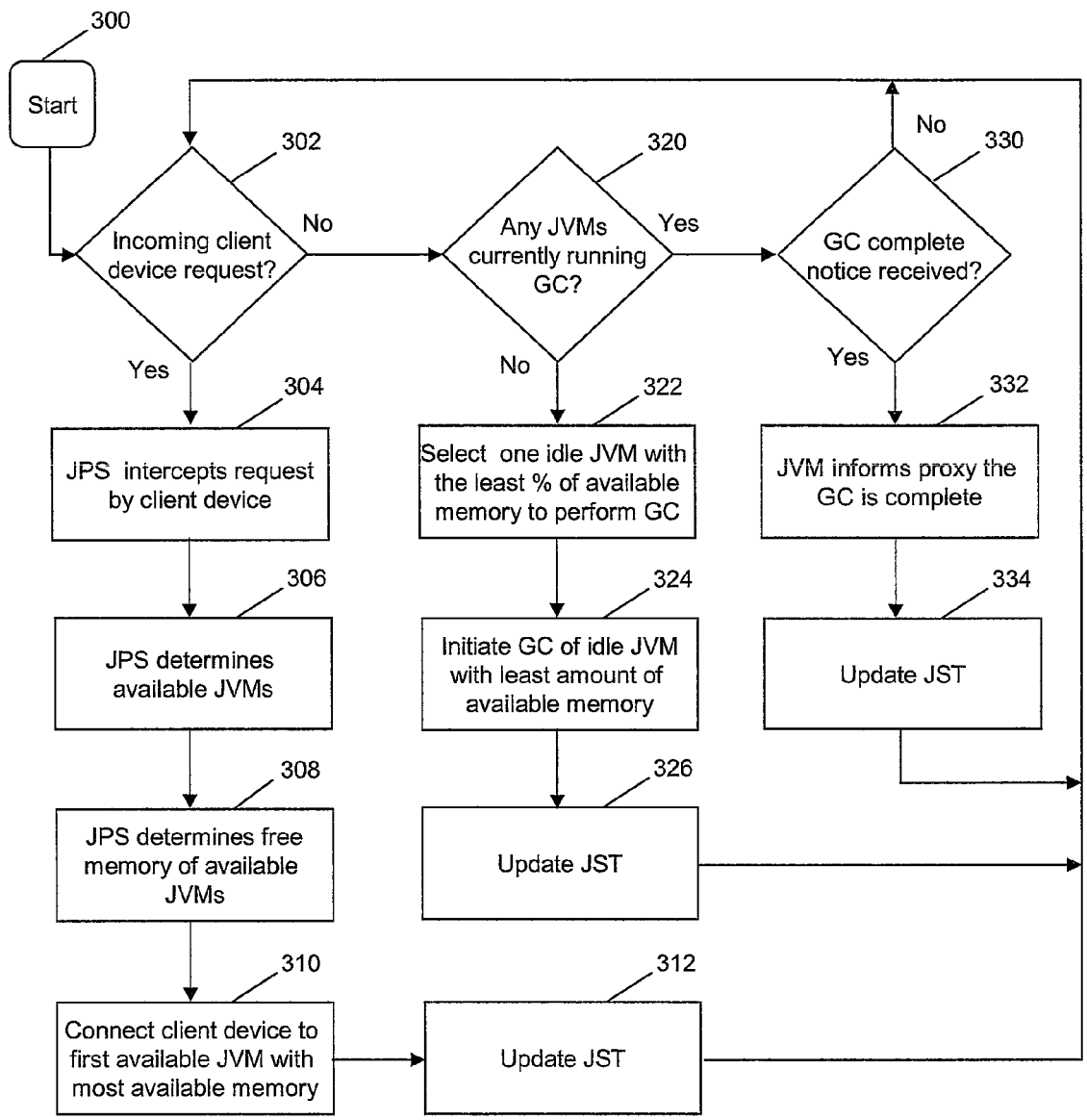
FIG. 3. is a high-level logical flowchart of an exemplary method for using a java proxy server to route incoming connections to two or more java virtual machines.

With reference now to FIG. 3, a high-level logical flowchart of an exemplary method for using a java proxy server to route incoming connections to two or more java virtual machines is presented. After initiator block 300, a java routing logic (JRL) of a java proxy server (JPS) determines if a request has been received to connect a client device to a JVM (block 302). When JPS determines than a connection request has been received, JPS intercepts the request (block 304). The JPS next determines which JVMs are not performing a garbage collection by reading a Java Status Table (JST) of JPS (block 306). The JPS then reads JST to determine the amount of free memory of each of the available JVMs connected to JPS (block 308). Using this information, JRL selects an available JVM with the highest amount of free memory available, and connects the client device to the selected JVM (block 310). By selecting the JVM with the highest amount of free memory available that is not performing garbage collection, the client device receives the best possible performance by a JVM. Following the client connecting to the selected JVM, JST is updated to reflect the amount of free memory available (block 312). The process loops in an iterative manner to block 302.

When JRL determines that no request has been received to connect a client device to a connected JVM (block 302), JRL will determine if any JVMs are currently performing a garbage collection by reading JST (block 320). Upon JRL determining that no JVMs are currently performing a garbage collection, JRL selects the JVM with the least amount of available memory and no connected client devices to perform a garbage collection (block 322). JPS then transmits an instruction to the selected JVM to initiate the garbage collection (block 324). Upon initiating the instruction to begin garbage collection, the selected JVM transmits a data packet to JPS informing JPS that garbage collection has begun. Upon JPS receiving the data packet, JRL updates JST to identify the selected JVM as "unavailable" (block 326). The process loops in an iterative manner to block 302.

When JRL determines that no request has been received to connect a client device to a connected JVM (block 302) and that a connected JVM is currently performing garbage collection, JRL will determine if the selected JVM has transmitted notice that the garbage collection operation is complete (block 330). If the notice has not been received, the process loops in an iterative manner to block 302. When the garbage collection has completed, the selected JVM transmits a notice to JPS that the JPS has completed the garbage collection and is available for connection to client devices. Upon JPS receiving the notice, JRL updates JST to identify the selected JVM as "available" (block 334). The process loops in an iterative manner to block 302.

Although aspects of the present invention have been described with respect to a computer processor and program application/logic, it should be understood that at least some aspects of the present invention may alternatively be implemented as a program product for use with a data storage system or computer system. Programs defining functions of the present invention can be delivered to a data storage system or computer system via a variety of signal-bearing media, which include, without limitation, non-writable storage media (e.g. CD-ROM), writable storage media (e.g. a floppy diskette, hard disk drive, read/write CD-ROM, optical media), and communication media, such as computer and telephone networks including Ethernet. It should be understood, therefore, that such signal-bearing media, when carrying or encoding computer readable instructions that direct method functions of the present invention, represent alternative embodiments of the present invention. Further, it is understood that the present invention may be implemented by a system having means in the form of hardware, software, or a combination of software and hardware as described herein or their equivalent.

Having thus described the invention of the present application in detail and by reference to illustrative embodiments thereof, it will be apparent that modifications and variations are possible without departing from the scope of the invention defined in the appended claims. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for autonomously routing an incoming java connection request to an available java virtual machine, the method comprising:
    receiving a connection request from a client device to interconnect to a java virtual machine connected to a java proxy server;
    in response to receiving the connection request, reading a java status table, wherein the java status table includes:
        a list of java virtual machines connected to the java proxy server,
        an amount of available memory for each java virtual machine connected to the java proxy server, and
        an indication of which java virtual machines connected to the java proxy server are also available for interconnection to a client device, wherein when a java virtual machine is available for interconnection to a client device the java virtual machine is not performing a garbage collection operation;
    in response to the java proxy server reading the java status table, selecting, from the available java virtual machines, an available java virtual machine with a greatest percentage of available memory;
    connecting the client device to the selected available java virtual machine; and
    maintaining the connection of the client device to the selected available java virtual machine until the client device terminates the connection.

2. The method of claim 1, further comprising, receiving a data packet related to the selected available java virtual machine, wherein the data packet received includes:
    an update of the amount of available memory of the selected available java virtual machine;
    an update of the number of connections to the selected available java virtual machine; and
    an update of the garbage collection status of the selected available java virtual machine.

3. The method of claim 2, further comprising, in response to receiving the data packet related to the first available java virtual machine, updating the java status table.

4. The method of claim 1, further comprising, in response to the client device terminating the connection, determining if any java virtual machines connected to the java proxy server are performing a garbage collection operation.

5. The method of claim 4, further comprising, in response to the java proxy server determining that none of the java virtual machines connected to the java proxy server are performing a garbage collection operation, selecting a java virtual machine that has the least amount of available memory and is not connected to a client device; and
    issuing an instruction to the selected java virtual machine to perform a garbage collection.

6. The method of claim 5, further comprising, in response to the selected java virtual machine performing a garbage collection, updating the java status table to reflect the status of the selected java virtual machine as "unavailable".

7. A java proxy server comprising:
    a processor;
    a memory coupled to the processor;
    a connection medium to connect and exchange information with client devices and java virtual machines; and
    processing logic for:
    receiving a connection request from a client device to interconnect to a java virtual machine connected to a java proxy server;
    in response to receiving the connection request, reading a java status table, wherein the java status table includes:
        a list of java virtual machines connected to the java proxy server,
        an amount of available memory for each java virtual machine connected to the java proxy server, and
        an indication of which java virtual machines connected to the java proxy server are also available for interconnection to a client device, wherein when a java virtual machine is available for interconnection to a client device the java virtual machine is not performing a garbage collection operation;
    in response to the java proxy server reading the java status table, selecting, from the available java virtual machines, an available java virtual machine with a greatest percentage of available memory;

connecting the client device to the selected available java virtual machine; and maintaining the connection of the client device to the selected available java virtual machine until the client device terminates the connection.

8. The java proxy server of claim 7, wherein the processing logic further comprises, receiving a data packet related to the selected available java virtual machine, wherein the data packet received includes:

an update of the amount of available memory of the selected available java virtual machine;

an update of the number of connections to the selected available java virtual machine; and an update of the garbage collection status of the selected available java virtual machine.

9. The java proxy server of claim 8, wherein the processing logic further comprises, in response to receiving the data packet related to the first available java virtual machine, updating the java status table.

10. The java proxy server of claim 7, wherein the processing logic further comprises, in response to the client device terminating the connection, determining if any java virtual machines connected to the java proxy server are performing a garbage collection operation.

11. The java proxy server of claim 10, wherein the processing logic further comprises, in response to the java proxy server determining that none of the java virtual machines connected to the java proxy server are performing a garbage collection operation, selecting a java virtual machine that has the least amount of available memory and is not connected to a client device; and issuing an instruction to the selected java virtual machine to perform a garbage collection.

12. The java proxy server of claim 11, wherein the processing logic further comprises, in response to the selected java virtual machine performing a garbage collection, updating the java status table to reflect the status of the selected java virtual machine device as "unavailable".

13. A computer-readable medium having a plurality of instructions embodied therein, wherein the plurality of instructions, when executed by a processing device, allows a machine to:

receive a connection request from a client device to interconnect to a java virtual machine connected to a java proxy server;

in response to receiving the connection request, read a java status table, wherein the java status table includes:

a list of java virtual machines connected to the java proxy server, an amount of available memory for each java virtual machine connected to the java proxy server, and an indication of which java virtual machines connected to the java proxy server are also available for interconnection to a client device, wherein when a java virtual machine is available for interconnection to a client device the java virtual machine is not performing a garbage collection operation;

in response to the java proxy server reading the java status table, selecting, from the available java virtual machines, an available java virtual machine with a greatest percentage of available memory;

connect the client device to the selected available java virtual machine; and maintain the connection of the client device to the selected available java virtual machine until the client device terminates the connection.

14. The computer-readable medium of claim 13, wherein the plurality of instructions further comprises, receive a data packet related to the selected available java virtual machine, wherein the data packet received includes:

an update of the amount of available memory of the selected available java virtual machine;

an update of the number of connections to the selected available java virtual machine; and an update of the garbage collection status of the selected available java virtual machine.

15. The computer-readable medium of claim 14, wherein the plurality of instructions further comprises, in response to receiving the data packet related to the first available java virtual machine, update the java status table.

16. The computer-readable medium of claim 13, wherein the plurality of instructions further comprises, in response to the client device terminating the connection, determine if any java virtual machines connected to the java proxy server are performing a garbage collection operation.

17. The computer-readable medium of claim 16, wherein the plurality of instructions further comprises, in response to the java proxy server determining that none of the java virtual machines connected to the java proxy server are performing a garbage collection operation, select a java virtual machine that has the least amount of available memory and is not connected to a client device; and issue an instruction to the selected java virtual machine to perform a garbage collection.

18. The computer-readable medium of claim 17, wherein the plurality of instructions further comprises, in response to the selected java virtual machine performing a garbage collection, update the java status table to reflect the status of the selected java virtual machine as "unavailable".

* * * * *